United States Patent
Seo et al.

(10) Patent No.: US 9,462,212 B2
(45) Date of Patent: Oct. 4, 2016

(54) DISPLAY APPARATUS AND METHOD FOR UPDATING TIME INFORMATION THEREOF

(71) Applicant: SAMSUNG ELECTRONICS CO., LTD., Suwon-si, Gyeonggi-do (KR)

(72) Inventors: Min-suk Seo, Suwon-si (KR); Jeong-kee Park, Seongnam-si (KR); Jong-po Lee, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/922,296

(22) Filed: Oct. 26, 2015

(65) Prior Publication Data

US 2016/0127676 A1 May 5, 2016

(30) Foreign Application Priority Data

Oct. 30, 2014 (KR) .................. 10-2014-0149272

(51) Int. Cl.
*H04N 5/63* (2006.01)
*H04N 7/025* (2006.01)
*H04N 5/907* (2006.01)
*H04N 5/50* (2006.01)
*H04N 7/088* (2006.01)

(52) U.S. Cl.
CPC .................. *H04N 5/63* (2013.01); *H04N 5/50* (2013.01); *H04N 5/907* (2013.01); *H04N 7/0255* (2013.01); *H04N 7/0884* (2013.01)

(58) Field of Classification Search
CPC .......... H04N 5/63; H04N 5/50; H04N 5/907; H04N 7/0255; H04N 7/0884; G06F 1/3202; G06F 1/30; G06F 1/26
USPC ........ 348/461, 730, 731; 713/300, 320, 321, 713/330, 340
IPC ................. H04N 5/63,5/907, 7/088, 7/00, 5/50, H04N 7/025
See application file for complete search history.

(56) References Cited

U.S. PATENT DOCUMENTS

| | | | | |
|---|---|---|---|---|
| 6,329,787 B1* | 12/2001 | Ito | ............................ | A63F 13/12 320/114 |
| 2007/0242170 A1* | 10/2007 | Ogino | ...................... | G09G 3/36 348/730 |
| 2009/0055664 A1* | 2/2009 | Nagamune | ......... | H03K 19/0016 713/300 |
| 2012/0324260 A1* | 12/2012 | Kezuka | .................... | H04N 5/57 713/320 |

* cited by examiner

*Primary Examiner* — Sherrie Hsia
(74) *Attorney, Agent, or Firm* — Nixon & Vanderhye, P.C.

(57) ABSTRACT

A display apparatus and a method for updating time information thereof are provided. The display apparatus includes a display, a power supply configured to supply power to a controller in response to alternating current (AC) power being supplied to the display apparatus, a tuner configured to receive a broadcast signal from an external source, and a controller configured to control the power supply to supply power to the tuner, to extract time information from the broadcast signal received from the tuner, and to update time information of the display apparatus based on the extracted time information, in response to AC power supply to the display apparatus being detected.

17 Claims, 5 Drawing Sheets

DISPLAY APPARATUS AND METHOD FOR UPDATING TIME INFORMATION THEREOF

CROSS-REFERENCE TO RELATED APPLICATIONS

This application is based on and claims priority under 35 U.S.C. §119 to Korean Patent Application No. 10-2014-0149272, filed on Oct. 30, 2014, in the Korean Intellectual Property Office, the disclosure of which is incorporated by reference herein in its entirety.

BACKGROUND

1. Field

Apparatuses and methods of the disclosure relate to a display apparatus and a method for updating time information thereof, and for example, a display apparatus and a method for updating time information thereof, for extracting time information of a broadcast signal as a background operation to update the time information when time information is lost due, for example, to a blackout, etc.

2. Description of Related Art

Time information in a display apparatus such as a digital television (DTV) is required to perform a timed recording function, an alarm function, or the like. For example, a TV may track current time using a real time clock (RTC) module of a micom even in a standby mode. Accordingly, a display apparatus may perform an operation for powering on when reserved time is reached. However, when, for example, there is a blackout or alternating current (AC) cord is unplugged, time information of a display apparatus may be lost, and an operation such as recording may not performed on time.

Conventionally, the aforementioned issue is overcome by supplying power for a predetermined time period by disposing a battery around an RTC module of a micom even if there is a blackout.

However, when the battery is dead, a function is not performed, and thus the conventional method is not an acceptable design method. In addition, material costs are increased by including additional batteries.

SUMMARY

Example embodiments of the disclosure overcome the above disadvantages and other disadvantages not described above.

The example embodiments provide a display apparatus and a method for updating time information thereof, for preparing for an unexpected loss of time information, such as, for example, a blackout via a method for receiving a broadcast signal as, for example, a background operation and extracting time information from the received broadcast signal when the time information is lost.

According to an aspect of the example embodiments, a display apparatus includes a display, a power supply configured to supply power to a controller in response to alternating current (AC) power being supplied to the display apparatus, a tuner configured to receive a broadcast signal from an external source, and a controller configured to control the power supply to supply power to the tuner, to extract time information from the broadcast signal received from the tuner, and to update time information of the display apparatus based on the extracted time information, in response to AC power being supplied to the display apparatus being detected.

The controller may include a sub-controller and a main controller. In response to AC power being supplied to the display apparatus, the power supply may supply power to the sub-controller, and the sub-controller may be configured to control the power supply to supply power to the main controller and the tuner.

The sub-controller may be configured to determine whether power is supplied to the main-controller and the tuner, based on whether information stored in a volatile memory is deleted.

The sub-controller may be configured to control the power supply to shut off power supplied to the main controller and the tuner and to enter a standby mode after the time information of the display apparatus is updated.

The sub-controller may be configured to control the power supply not to supply power to the display while power is supplied to the main controller and the tuner.

The tuner may convert the broadcast signal received from the external source into a digital-processable transport stream (TS) signal, and the main controller may receive the converted TS signal from the tuner and decode the TS signal to extract time information using a program clock reference (PCR) value.

The sub-controller may include a real time clock (RTC) module, and the RTC module may be activated using the extracted time information.

The display apparatus may further include a storage, wherein the sub-controller, in response to timed recording/alarm schedule being stored in the storage, sets the timed recording/alarm schedule in the activated RTC module.

The main controller may be configured to transmit the extracted time information to the sub-controller using a universal asynchronous receiver/transmitter (UART).

According to an aspect of the example embodiments, a method for updating time information of a display apparatus includes supplying power to a controller and a tuner of the display apparatus in response to alternating current (AC) power being supplied to the display apparatus, extracting time information from a TS signal in response to a transport stream (TS) signal converted through the tuner, and updating time information of the display apparatus based on the extracted time information.

The controller may include a sub-controller and a main controller, and supplying may include, in response to AC power being supplied to the display apparatus, supplying power to the sub-controller through a power supply, and controlling the power supply to supply power to the main controller and the tuner by the sub-controller.

The method may further include determining whether power is supplied to the main controller and the tuner by the sub-controller, based on whether information stored in a volatile memory is deleted.

The method may further include, after time information of the display apparatus is updated, shutting off power supplied to the main controller and the tuner and entering a standby mode.

Supplying may include, not supplying power to a display while power is supplied to the main controller and the tuner.

Extracting may include decoding the received TS signal to extract time information using a program clock reference (PCR) value.

Updating may include activating a real time clock (RTC) module using the extracted time information.

The method may further include, in response to timed recording/alarm schedule being stored, setting the timed recording/alarm schedule in the activated RTC module.

Extracting may include transmitting the extracted time information using a universal asynchronous receiver/transmitter (UART).

According to the aforementioned example embodiments, time information may be automatically updated in the background and transparently to a user. In addition, an unexpected event such as, for example, a blackout may be prepared for without increase in additional material costs, such as, for example a battery backup system.

Additional and/or other aspects and advantages of the example embodiments will be set forth in part in the description which follows and, in part, will be apparent from the description.

BRIEF DESCRIPTION OF THE DRAWING FIGURES

The above and/or other aspects and advantages of the disclosure will become more apparent from the following detailed written description taken in conjunction with the accompanying drawings, in which like reference numerals refer to like elements, and wherein.

DETAILED DESCRIPTION

Reference will now be made to example embodiments, which are illustrated in the accompanying drawings. In the following description, a detailed description of known functions and configurations incorporated herein will be omitted when it may make the subject matter of the disclosure unclear. The terms used in the specification are defined in consideration of functions used, and can be changed according to the intent or conventionally used methods of clients, operators, and users. Accordingly, definitions of the terms should be understood on the basis of the entire description of the disclosure.

The terms "first", "second", etc. may be used to describe diverse components, but the components are not limited by the terms. The terms are only used to distinguish one component from the others.

The terms used in the present application are only used to describe the example embodiments, but are not intended to limit the scope of the disclosure. The singular expression also includes the plural meaning as long as it does not conflict with the context. In the disclosure, the terms "include" and "consist of" designate the presence of features, numbers, steps, operations, components, elements, or a combination thereof that are described in the disclosure, but do not exclude the presence or possibility of addition of one or more other features, numbers, steps, operations, components, elements, or a combination thereof.

In the example embodiments, a "module" or a "unit" performs at least one function or operation, and may be implemented with hardware (e.g., electronic, electrical and/or digital circuitry), software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Figure 1:
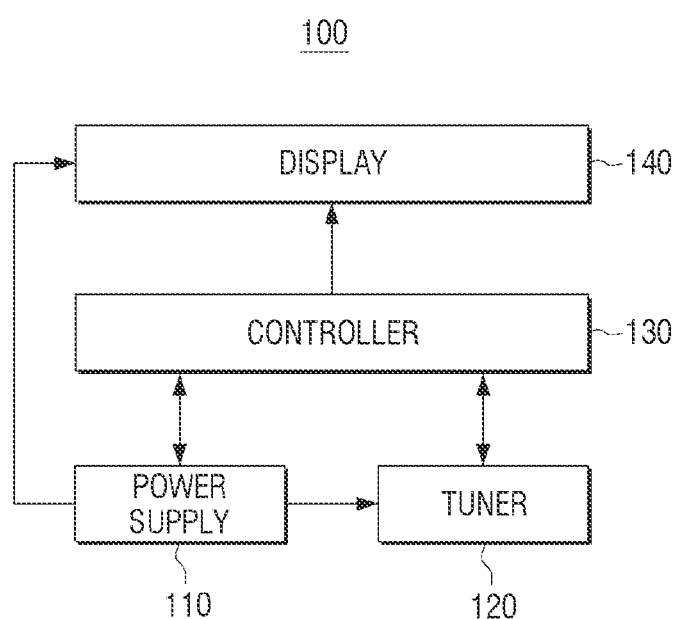
FIG. 1 is a schematic block diagram illustrating a configuration of a display apparatus according to an example embodiment.

FIG. 1 is a schematic block diagram illustrating a configuration of a display apparatus 100 according to an example embodiment. Referring to FIG. 1, the display apparatus 100 includes a power supply 110, a tuner 120, a controller 130, and a display 140. The display apparatus 100 will be described with reference to a DTV for convenience. However, it will be understood that this is merely an example, and that the display apparatus 100 is not so limited thereto.

The power supply 110 supplies power to other components of the display apparatus 100. Even in a standby mode in which the display apparatus 100 does not operate and is simply connected to an AC power source, the power supply 110 supplies power to a portion of the controller 130. The power supply 110 receives a control signal of the controller 130 and supplies power to the tuner 120, the display 140, and so on. For example, when a user pushes a power button of a TV to power on the TV, the controller 130 may transmit an INT signal (an interrupt signal) to the power supply 110. The power supply 110 that receives the INT signal may supply power to the tuner 120, the display 140, and so on to power on the TV.

The tuner 120 converts a broadcast signal into a digital-processable transport stream (TS). The broadcast signal may be a radio frequency (RF) signal. In addition, the broadcast signal may, for example, be transmitted through a terrestrial, cable, satellite broadcast system, etc.

The controller 130 may be configured to control overall components of the display apparatus 100. In particular, in response to AC power being supplied to the display apparatus 100 through the power supply 110, the controller 130 may be configured to control the power supply 110 to supply power to the tuner 120. In addition, the controller 130 may be configured to extract time information from the TS signal received through the tuner 120. The controller 130 may be configured to update time information of the display apparatus 100 based on the extracted time information.

The display 140 displays an image signal. In general, in response to an INT signal being transmitted to the power supply 110 from the controller 130, the display 140 may also receive power. However, power may be supplied only to the remaining components except for the display 140. This is generally referred to as 'fake power on'. Since power is not supplied to the display 140, a background operation such as updating of time information may be performed even when a user is unaware of such an operation being performed.

Figure 2:
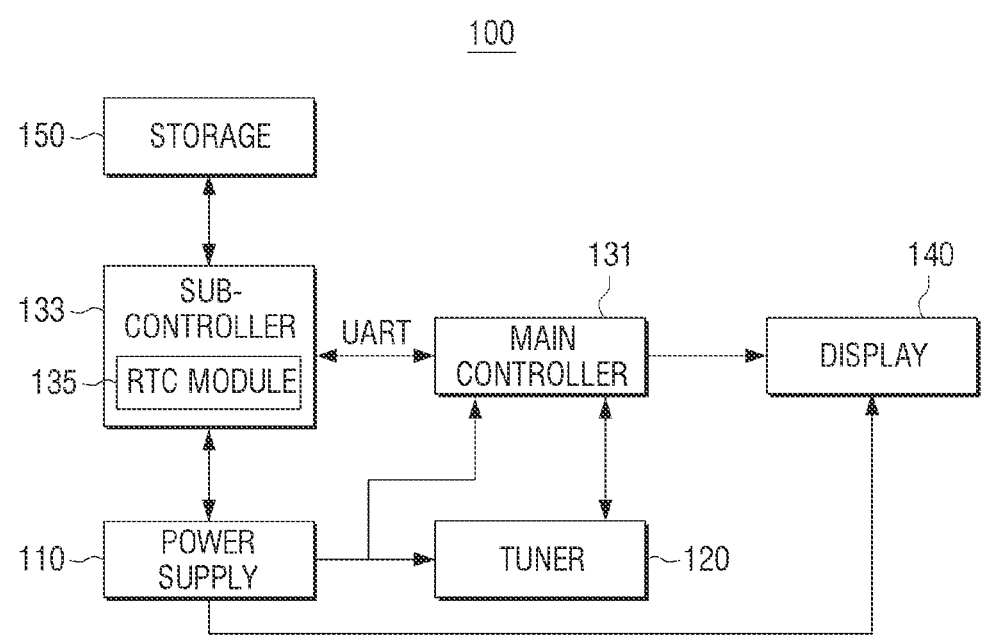
FIG. 2 is a block diagram illustrating a configuration of a display apparatus according to an example embodiment.

FIG. 2 is a block diagram illustrating a configuration of the display apparatus 100 according to an example embodiment. Referring to FIG. 2, the display apparatus 100 includes the power supply 110, the tuner 120, a main controller 131, a sub controller 133, a real time clock (RTC) module 135, the display 140, and a storage 150.

The power supply 110 supplies power to each component of the display apparatus 100. For example, the power supply 110 may be a switched-mode power supply (SMPS). The SMPS refers to a power supply including a switching regulator. The SMPS reduces the size and weight of an electric transformer compared with a linear power supply, and thus is largely used in an internal circuit of the display apparatus 100.

In response to AC power being connected to the power supply 110, the power supply 110 supplies power to the sub controller 133. A state in which power is supplied only to the sub controller 133 is referred to as a standby mode or a standby state. In response to a signal, indicating that power is to be supplied to the tuner 120, the main controller 131, and so on, being received from the sub controller 133, the power supply 110 supplies power to other components of the display apparatus 100, such as the tuner 120 and the main controller 131.

The tuner 120 converts the broadcast signal received, for example, in the form of an RF signal into a transport stream (TS) signal. The TS signal is a digital-processable signal and is typically the type used.

The controller 130 includes the main controller 131 and the sub controller 133. For example, the main controller 131 and the sub controller 133 may be realized as, but are not limited to, one chip and may be realized as separate components, and for example, the main controller 131 may be realized as a CPU and the sub controller 133 may be realized as a micom. In addition, when the main controller 131 and the sub controller 133 are realized as separate components, the main controller 131 and the sub controller 133 may be connected to a universal asynchronous receiver/transmitter (UART).

The main controller 131 may be configured to control an overall function of the display apparatus 100. For example, the main controller 131 may be a central processing unit (CPU).

According to an example embodiment, the main controller 131 decodes the TS signal received from the tuner 120 to extract time information. Since the broadcast signal includes its own time information, when time information of the display apparatus 100 is lost, time information may be extracted from the received broadcast signal and used to update the time of the display apparatus. For example, the main controller 131 may extract time information as a program clock reference (PCR) value.

According to an example embodiment, the main controller 131 may transmit the extracted time information to the sub controller 133 using, for example, the universal asynchronous receiver/transmitter (UART). The UART may be a separate integrated circuit that is generally used for serial communication via a serial port. For example, the UART may be used along with the communication standard such as EIA RS-232, RS-422, and RS-485, etc.

The sub controller 133 may be configured to control power and/or an on/off operation of the display apparatus 100. For example, the sub controller 133 may be, for example, a micom. In response to AC power being connected to the display apparatus 100, the power supply 110 supplies power to the sub controller 133.

According to an example embodiment, the sub controller 133 may be configured to control the power supply 110 to supply power to the main controller 131 and the tuner 120. Upon determining that time information needs to be updated, the sub controller 133 may be configured to supply power to the main controller 131 and the tuner 120 such that the display apparatus 100 extracts time information from the broadcast signal.

According to an example embodiment, the sub controller 133 may be configured to automatically determine that time information needs to be updated, for example, without user input. For example, the sub controller 133 may update time information based on whether information stored in a volatile memory is deleted. When an AC power cord is unplugged or there is a blackout, any information including time information stored in a volatile memory, such as, for example, a random access memory (RAM) of the sub controller 133 is deleted. Accordingly, the sub controller 133 may determine that there has been a blackout based on whether information stored in a volatile memory is deleted. When it is determined that the information stored in the volatile memory is deleted, the sub controller 133 may be configured to control the power supply 110 to supply power to the main controller 131 and the tuner 120. The sub controller 133 may be configured to transmit an INT signal to the power supply 110 to control the power supply 110 to supply power to the main controller 131 and the tuner 120.

According to an example embodiment, the sub controller 133 may be configured to control the power supply 110 to shut off power supplied to the main controller 131 and the tuner 120 and to enter a standby mode after time information of the display apparatus 100 is updated. In order to reduce unnecessary power consumption after updating of time information, the display apparatus 100 may enter a standby mode.

Figure 3:
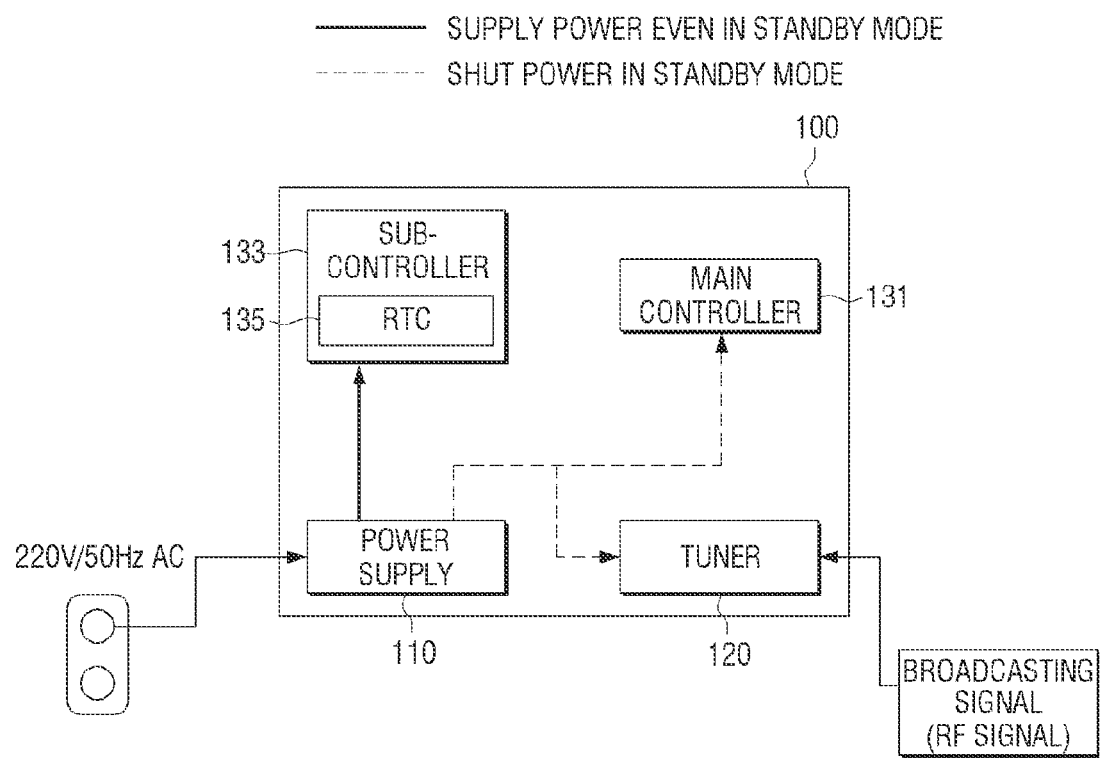
FIG. 3 is a diagram illustrating a portion to which power is supplied in a standby mode in a display apparatus according to an example embodiment.

A standby mode refers to a state in which power is supplied only to the sub controller 133. As illustrated in FIG. 3, power is also supplied to the sub controller 133 even in a standby mode. However, while a standby mode is maintained, since power is not supplied to the main controller 131 and the tuner 120, power consumption is reduced. Time is also tracked through an RTC module that may be included in the sub controller 133 in a standby mode, and thus a timed recording function, an alarm function, or the like of the display apparatus 100 may be performed with reduced or no errors. In order to exit a standby mode, the sub controller 133 may be configured to transmit a signal to the power supply 110. The sub controller 133 may be configured to transmit an INT signal to the power supply 110 to control the power supply 110 to supply power, for example, to the main controller 131 and the tuner 120.

According to an example embodiment, the sub controller 133 may be configured to control the power supply 110 to supply power to the main controller 131 and the tuner 120 and may simultaneously control the power supply 110 not to supply power to the display 140. For example, upon determining a blackout state by itself and updating time information, when the display 140 is turned on, a user may consider a current operation as an abnormal operation for automatically turning on and off a TV. Therefore, in a 'fake power on' state in which the display 140 is not turned on, time information may be updated as a background operation. According to this situation, in response to power being supplied to the main controller 131 and the tuner 120, the sub controller 133 may control the power supply 110 not to supply power to the display 140.

According to an example embodiment, the sub controller 133 includes a real time clock (RTC) module 135. In addition, the sub controller 133 may be configured to activate the RTC module 135 using the extracted time information. When pre-stored timed recording/alarm schedule is present in the storage 150, the sub controller 133 may set timed recording/alarm schedule in the activated RTC module 135. For example, assume that a user command for timed recording of a sports broadcast at 7:00 pm is stored before an AC power cord is unplugged and then plugged in. When the AC power cord needs to be unplugged, for example, in order to change a position of the display apparatus 100, the AC power cord is unplugged, and simultaneously, time information stored in the sub controller 133 is deleted. In response to the AC power cord being plugged in again, time information of the sub controller 133 is initialized, and thus actual current time and time recognized by the sub controller 133 are different. Accordingly, there is a problem in that timed recording proceeds at a different time from 7:00 pm intended by a user. The sub controller 133 may be configured to activate the RTC module 135 using time information extracted from the broadcast signal to track actual time.

The display 140 displays various image signals including a broadcast signal. The display 140 may not operate when time information is updated as a background operation. For example, in the case of 'fake power on', power is supplied to the main controller 131, the tuner 120 and so on, whereas power is not supplied to the display 140. The display 140 may be designed as various display panels. That is, the display 140 may be realized as various display technologies such as a liquid crystal display (LCD), an organic light-emitting diode (OLED), E-paper, a plasma display panel (PDP), a vacuum fluorescent display (VFD), a field emission display (FED), and an electro luminescence display (ELD), etc. In addition, the display 140 may be in the form of a curved display with a curved shape.

The storage 150 stores various programs and data items required for an operation of the display apparatus 100. In addition, the storage 150 stores schedules such as timed recording, alarm, and sleep reservation. The storage 150 may include a random access memory (RAM) and a read-only memory (ROM). The ROM may be used to uni-directionally transmit data and a command to a central processing unit (CPU) and a RAM is bi-directionally used to transmit data and a command, in general.

Figure 4:
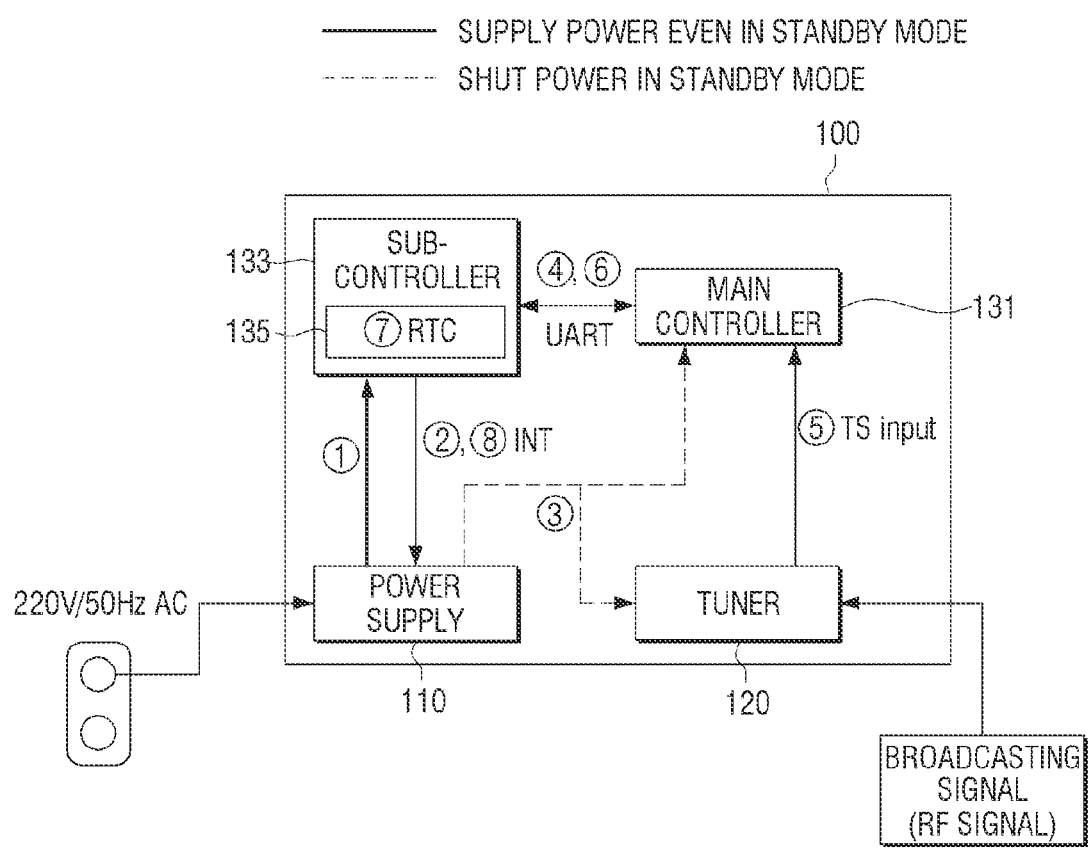
FIG. 4 is a diagram illustrating updating of time information by a display apparatus according to an example embodiment.

With reference to FIG. 4, an operation of updating time information by the display apparatus 100 will be illustrated. FIG. 4 is a diagram illustrating updating of time information by a display apparatus according to an example embodiment. For convenience of description, an example in which there is a blackout will be described.

When there is a blackout and then power is restored, power is supplied to the sub controller 133 through the power supply 110. Accordingly, the sub controller 133 is re-operated. The sub controller 133 may check a last mode state and determine whether AC power supply is stopped in a standby mode. For example, the sub controller 133 may check whether information items stored in a volatile memory such as a RAM included in the sub controller 133 are deleted to determine there is a blackout (e.g., operation ①).

Since time information for an RTC operation is deleted due to a blackout, the sub controller 133 transmits a signal to the power supply 110 in order to acquire time information. The signal transmitted to the power supply 110 is a control signal for supplying power in order to operate the main controller 131 and the tuner 120. In this case, in order to prevent confusion to a user, the sub controller 133 may control the power supply 110 not to supply power to the display 140. Accordingly, when a screen of the display 140 is turned off, time information is updated (e.g., operations ② and ③).

After power is supplied to the main controller 131 and the tuner 120, the sub controller 133 requests current time information from the main controller 131. Communication between the sub controller 133 and the main controller 131 is performed through UART (e.g., operation ④).

The tuner 120 converts an RF broadcast signal received from an external source into a TS signal as a digital signal and transmits the TS signal to the main controller 131. The main controller 131 extracts information associated with time from a packet of the TS signal. For example, the main controller 131 may extract time information as a PCR value (e.g., operation ⑤).

The main controller 131 transmits the extracted time information to the sub controller 133 using the UART (e.g., operation).

The sub controller 133 inputs the current time information received from the main controller 131 to an internal RTC module 135. The RTC module 135 may track time in the same way as actual time, based on the updated time information. For example, when timed recording schedule is stored in the storage 150, if time corresponding to the timed recording schedule is reached using the RTC module 135, the display apparatus 100 performs a timed recording function (e.g., operation ⑦).

When time information is completely updated, the sub controller 133 transmits a control signal to the power supply 110 so as not to supply power to the main controller 131 and the tuner 120 in order to return to a standby mode (e.g., operation ⑧).

Accordingly, when time information is deleted due to unexpected events, such as, for example, a blackout, time information is updated without increase in additional material costs. In addition, a time information updating function may be automatically provided without user recognition.

Figure 5:
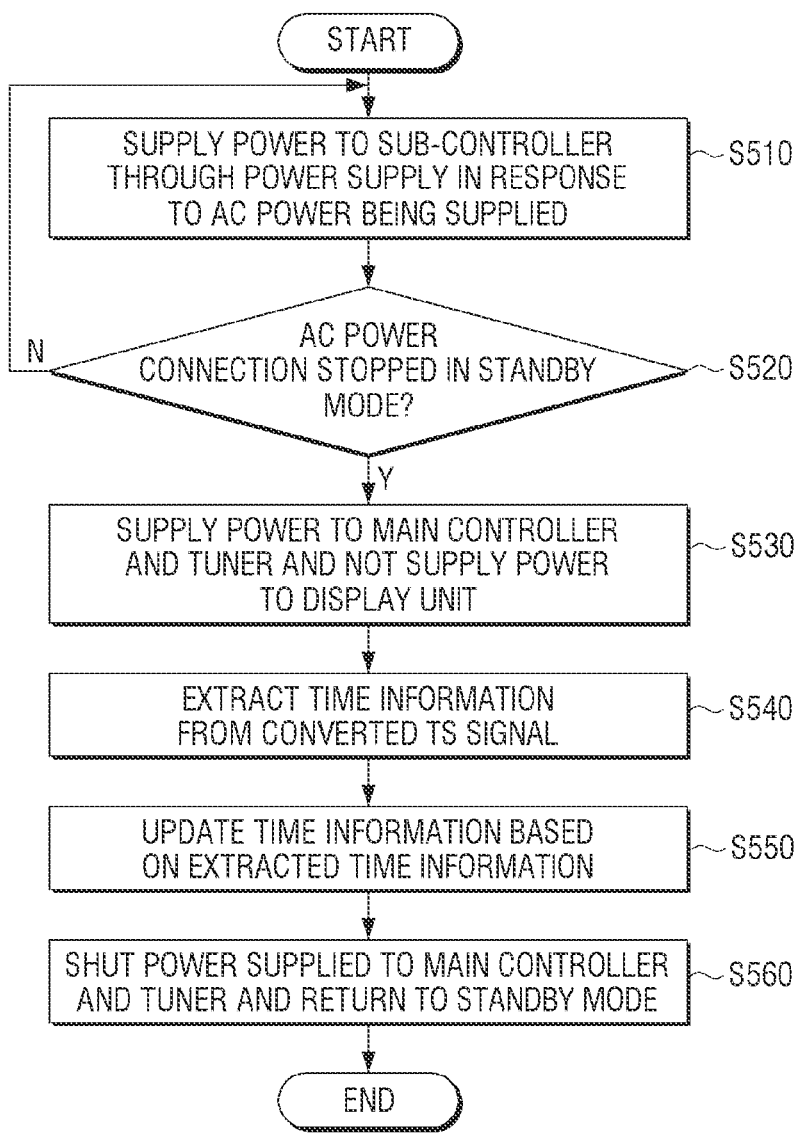
FIG. 5 is a flowchart illustrating a method for updating time information of a display apparatus according to an example embodiment.

With reference to FIG. 5, a method for updating time information of the display apparatus 100 will be described.

FIG. 5 is a flowchart illustrating a method for updating time information of the display apparatus 100 according to an example embodiment. First, in response to AC power being supplied, power is supplied to a sub controller through a power supply (S510). A state in which power is supplied only to the sub controller is referred to as a standby mode or a standby state. For example, the standby mode may be a state in which only an AC cord of a TV is plugged in and the TV is turned off. A user may deem that the TV is turned off from an outer appearance of the TV, but power is supplied to the sub controller and the RTC module is operated as a background operation.

The display apparatus 100 determines whether AC power supply is stopped in a standby mode state (S520). For example, the case in which AC power is stopped corresponds, for example, to a case in which an unexpected event such as a blackout occurs irrespective of a user's intention and a case in which a user intentionally unplugs an AC cord for movement of the display apparatus 100, etc. According to an example embodiment, the display apparatus 100 may determine whether AC power is stopped in a standby mode state based on whether information stored in a volatile memory of a sub-controller is deleted. Upon determining that AC power connection is maintained (S520-N), the display apparatus 100 maintains a standby mode.

Upon determining that AC power connection is stopped (S520-Y), the display apparatus 100 initiates an operation for updating time information. For example, upon checking that information stored in a non-volatile memory in a sub-controller is completely deleted, the display apparatus 100 may determine that AC power connection is stopped.

The display apparatus 100 then supplies power to components other than the sub-controller in order to update time information. For example, the display apparatus 100 supplies power to a main controller and a tuner and does not supply power to a display (S530). Power is supplied to the main controller and the tuner because the main controller and the tuner are components required for an operation of processing a received broadcast signal to extract time information. When time information is updated as a background operation, power is not required to be supplied to the display, and when power is supplied to the display, a user may deem that the display apparatus 100 operates without the user's intention, thereby causing confusion to the user. The case in which other components operate while the display is turned off is referred to as 'fake power on'.

The display apparatus 100 extracts time information from the converted transport stream (TS) signal (S540). The display apparatus 100 receives a broadcast signal from an external source. For example, the broadcast signal may be an RF signal transmitted through a terrestrial, cable, satellite communication, etc. The display apparatus 100 converts the received RF broadcast signal into a digital-processable TS signal. For example, the display apparatus 100 may detect the TS signal to extract time information using a program clock reference (PCR) value. The time information extracted by the main controller may be transmitted by a sub-controller using a UART communication method.

The display apparatus 100 updates time information based on the extracted time information (S550). For example, the display apparatus 100 may activate a RTC module based on the extracted time information. The RTC module tracks current time. In response to accurate time information extracted using the broadcast signal being input, the RTC module may track current time if AC power is not stopped.

According to an example embodiment, when schedules such as timed recording, alarm, and so on are stored, a function of timed recording, alarm, and so on may be set for the activated RTC module. The display apparatus 100 may provide a function such as timed recording on time according to user intention despite of an unexpected event such as a blackout using the RTC module with updated time information.

The display apparatus 100 that has updated time information then shuts off power supplied to the main controller and the tuner and returns a standby mode (S560). As the display apparatus 100 returns to the standby mode, the display apparatus 100 may reduce unnecessary power consumption.

Through a time information updating method of the aforementioned display apparatus 100, user convenience of directly updating time information may be increased. In addition, this operation is performed as a background operation, and thus the user may use a display apparatus without requirement for recognition of time information update. In addition, an unexpected event such as a blackout may be prepared for without an increase in additional material costs.

A program code for performing the aforementioned time information updating method according to various example embodiments may be stored in various types of recording media. In detail, the program code may be stored in various types of terminal-readable recording media by a terminal, such as a random access memory (RAM), a flash memory, a read only memory (ROM), an erasable programmable ROM (EPROM), an electronically erasable and programmable ROM (EEPROM), a register, a hard disk, a removable disk, a memory disk, a universal serial bus (USB) memory, a compact disk-ROM (CD-ROM), etc.

The foregoing example embodiments and advantages are merely examples and are not to be construed as limiting the disclosure. Also, the description of the example embodiments is intended to be illustrative, and not to limit the scope of the claims, and many alternatives, modifications, and variations will be apparent to those skilled in the art.

What is claimed is:

1. A display apparatus comprising:
 a display;
 a power supply configured to supply power to a controller in response to alternating current (AC) power being supplied to the display apparatus;
 a tuner configured to receive a broadcast signal from an external source; and
 the controller configured to control the power supply to supply power to the tuner, to extract time information from the broadcast signal received from the tuner, and to update time information of the display apparatus based on the extracted time information, in response to AC power supply, being detected, to the display apparatus being detected.

2. The display apparatus as claimed in claim 1, wherein:
 the controller comprises a sub-controller and a main controller;
 in response to AC power being supplied to the display apparatus, the power supply supplies power to the sub-controller; and
 the sub-controller is configured to control the power supply to supply power to the main controller and the tuner.

3. The display apparatus as claimed in claim 2, wherein the sub-controller is configured to determine whether power is supplied to the main-controller and the tuner, based on whether information stored in a volatile memory is deleted.

4. The display apparatus as claimed in claim 2, wherein the sub-controller is configured to control the power supply to shut off power supplied to the main controller and the tuner and to enter a standby mode after the time information of the display apparatus is updated.

5. The display apparatus as claimed in claim 2, wherein the sub-controller is configured to control the power supply not to supply power to the display while power is supplied to the main controller and the tuner.

6. The display apparatus as claimed in claim 2, wherein:
 the tuner converts the broadcast signal received from the external source into a digital-processable transport stream (TS) signal; and
 the main controller receives the converted TS signal from the tuner and decodes the TS signal to extract time information using a program clock reference (PCR) value.

7. The display apparatus as claimed in claim 2, wherein:
 the sub-controller comprises a real time clock (RTC) module; and
 the RTC module is activated using the extracted time information.

8. The display apparatus as claimed in claim 7, further comprising a storage,
 wherein the sub-controller is configured to set a timed recording/alarm schedule in the activated RTC module, in response to the timed recording/alarm schedule being stored in the storage.

9. The display apparatus as claimed in claim 2, wherein the main controller is configured to transmit the extracted time information to the sub-controller using a universal asynchronous receiver/transmitter (UART).

10. A method for updating time information of a display apparatus, comprising:
 supplying power to a controller and a tuner of the display apparatus in response to alternating current (AC) power being supplied to the display apparatus;
 converting a received broadcast signal to a transport stream (TS) signal through the tuner, and extracting time information from the TS signal; and
 updating time information of the display apparatus based on the extracted time information.

11. The method as claimed in claim 10, wherein:
the controller comprises a sub-controller and a main controller; and
supplying comprises, in response to AC power being supplied to the display apparatus, supplying power to the sub-controller through a power supply, and controlling the power supply to supply power to the main controller and the tuner by the sub-controller.

12. The method as claimed in claim 11, further comprising determining whether power is supplied to the main controller and the tuner by the sub-controller, based on whether information stored in a volatile memory is deleted.

13. The method as claimed in claim 11, further comprising: after time information of the display apparatus is updated, shutting off power supplied to the main controller and the tuner and entering a standby mode.

14. The method as claimed in claim 11, wherein supplying comprises, not supplying power to a display while power is supplied to the main controller and the tuner.

15. The method as claimed in claim 10, wherein extracting comprises decoding the received TS signal to extract time information using a program clock reference (PCR) value.

16. The method as claimed in claim 10, wherein updating comprises activating a real time clock (RTC) module using the extracted time information.

17. The method as claimed in claim 16, further comprising, in response to timed recording/alarm schedule being stored, setting the timed recording/alarm schedule in the activated RTC module.

* * * * *